(12) United States Patent
Srinivasaraghavan

(10) Patent No.: US 12,331,880 B2
(45) Date of Patent: Jun. 17, 2025

(54) SYSTEMS AND METHOD FOR CONTROLLING LUBRICATION

(71) Applicant: International Engine Intellectual Property Company, LLC, Lisle, IL (US)

(72) Inventor: Srinarayanprasaadh Srinivasaraghavan, Palatine, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 18/519,398

(22) Filed: Nov. 27, 2023

(65) Prior Publication Data
US 2025/0172243 A1    May 29, 2025

(51) Int. Cl.
*F01M 5/00*    (2006.01)
*F16N 29/02*    (2006.01)

(52) U.S. Cl.
CPC .......... *F16N 29/02* (2013.01); *F16N 2250/04* (2013.01); *F16N 2250/08* (2013.01); *F16N 2270/52* (2013.01)

(58) Field of Classification Search
CPC .............................. F16N 29/02; F16N 2270/52
See application file for complete search history.

(56) References Cited

U.S. PATENT DOCUMENTS

| | | | | |
|---|---|---|---|---|
| 2,403,326 | A * | 7/1946 | Baker | F16D 13/52 184/6 |
| 3,557,767 | A * | 1/1971 | Green | B01D 35/14 184/6.24 |
| 6,895,807 | B2 * | 5/2005 | Han | F01M 11/10 73/54.01 |
| 6,901,788 | B2 * | 6/2005 | Han | F01M 11/10 73/54.01 |
| 7,275,420 | B2 * | 10/2007 | Discenzo | G01N 33/2888 73/290 R |
| 7,444,977 | B2 * | 11/2008 | Dragsted | F01M 5/005 123/196 R |
| 7,581,434 | B1 * | 9/2009 | Discenzo | G01N 33/2888 73/53.01 |
| 8,109,138 | B2 * | 2/2012 | Han | G01N 11/06 73/114.55 |
| 8,417,440 | B2 * | 4/2013 | Takahashi | F01M 1/20 123/196 S |
| 8,869,940 | B2 * | 10/2014 | Johnson | F03D 80/70 184/6.12 |
| 11,175,274 | B2 * | 11/2021 | Zhang | G01N 33/2888 |
| 2004/0040789 | A1 * | 3/2004 | Rake | F16N 39/005 184/6.24 |

(Continued)

Primary Examiner — Michael A Riegelman
(74) Attorney, Agent, or Firm — Umang Khanna

(57) ABSTRACT

Systems and method for controlling lubrication are provided are provided. In one embodiment, a method includes receiving a temperature of a lubricant in a vehicle measured using at least one temperature sensor disposed on the vehicle, and receiving a pressure of the lubricant in the vehicle measured using at least one pressure sensor disposed on the vehicle. The method also includes determining a viscosity of the lubricant using the temperature, the pressure, and a pressure-temperature-viscosity (PTV) correlation, and based on the viscosity of the lubricant, controlling lubrication in the vehicle.

9 Claims, 7 Drawing Sheets

(56) References Cited

U.S. PATENT DOCUMENTS

| | | | |
|---|---|---|---|
| 2004/0211246 A1* | 10/2004 | Han | F01M 11/10 |
| | | | 73/54.01 |
| 2010/0187043 A1* | 7/2010 | Murahashi | F16H 57/0434 |
| | | | 184/6.3 |
| 2012/0241258 A1* | 9/2012 | Subramaniam | F16N 7/40 |
| | | | 184/6.4 |
| 2013/0074628 A1* | 3/2013 | Uusitalo | F16H 57/0435 |
| | | | 74/467 |
| 2013/0180478 A1* | 7/2013 | Ceynow | F01M 5/005 |
| | | | 123/540 |
| 2014/0238742 A1* | 8/2014 | Borek | F01M 1/16 |
| | | | 175/227 |
| 2015/0345616 A1* | 12/2015 | Schweiher | F16H 57/045 |
| | | | 184/6.12 |
| 2015/0362123 A1* | 12/2015 | Dorr | H04Q 9/00 |
| | | | 184/108 |

* cited by examiner

| Temp (°C) | FA-4 Oil | | | | | | | | | |
|---|---|---|---|---|---|---|---|---|---|---|
| | Kinematic Viscosity (cSt) | Dynamic Viscosity (cP) | Gauge Pressure (psig) | | | | Flow Rate (L/min) | | | |
| | | | 850 rpm | 1200 rpm | 1500 rpm | 2150 rpm | 850 rpm | 1200 rpm | 1500 rpm | 2150 rpm |
| 60 | 29.985 | 25.018 | 28.616 | 50.325 | 71.461 | 86.011 | 83.132 | 114.788 | 138.202 | 153.211 |
| 70 | 21.648 | 17.926 | 26.856 | 47.731 | 68.044 | 84.760 | 83.305 | 115.325 | 139.005 | 156.517 |
| 80 | 16.212 | 13.324 | 25.537 | 45.605 | 65.892 | 83.393 | 83.424 | 115.700 | 139.599 | 159.298 |
| 90 | 12.523 | 10.213 | 23.730 | 42.811 | 62.743 | 81.257 | 83.544 | 116.224 | 140.311 | 161.483 |
| 100 | 9.931 | 8.037 | 22.559 | 40.519 | 58.244 | 75.387 | 82.938 | 115.372 | 138.809 | 160.520 |
| 110 | 8.056 | 6.469 | 21.215 | 37.869 | 52.284 | 69.660 | 82.014 | 113.872 | 136.396 | 158.399 |
| 120 | 6.664 | 5.310 | 20.190 | 35.909 | 48.594 | 62.976 | 81.431 | 112.877 | 134.769 | 157.078 |
| 130 | 5.607 | 4.433 | 19.394 | 33.832 | 45.382 | 58.989 | 81.046 | 112.291 | 133.687 | 155.898 |
| 140 | 4.789 | 3.756 | 18.570 | 32.065 | 42.853 | 53.526 | 80.932 | 112.086 | 133.304 | 155.683 |

FIG. 5A

| Temp (°C) | Kinematic Viscosity (cSt) | Dynamic Viscosity (cP) | CK-4 Oil |||||||
|---|---|---|---|---|---|---|---|---|---|---|
| | | | Gauge Pressure (psig) |||| Flow Rate (L/min) ||||
| | | | 850 rpm | 1200 rpm | 1500 rpm | 2150 rpm | 850 rpm | 1200 rpm | 1500 rpm | 2150 rpm |
| 60 | 37.284 | 31.120 | 29.924 | 52.245 | 73.341 | 86.786 | 82.974 | 114.438 | 137.700 | 151.201 |
| 70 | 26.805 | 22.206 | 27.952 | 49.347 | 70.095 | 85.490 | 83.205 | 115.006 | 138.537 | 154.575 |
| 80 | 19.992 | 16.437 | 26.233 | 47.166 | 67.022 | 84.388 | 83.365 | 115.457 | 139.241 | 157.526 |
| 90 | 15.381 | 12.550 | 25.156 | 45.102 | 64.887 | 82.909 | 83.457 | 115.820 | 139.828 | 160.138 |
| 100 | 12.151 | 9.839 | 23.500 | 42.480 | 60.387 | 80.345 | 83.559 | 116.302 | 140.709 | 161.705 |
| 110 | 9.821 | 7.890 | 22.368 | 40.194 | 56.237 | 74.861 | 82.899 | 115.331 | 138.892 | 160.492 |
| 120 | 8.096 | 6.454 | 21.144 | 37.715 | 52.023 | 69.480 | 82.056 | 113.966 | 136.540 | 158.556 |
| 130 | 6.789 | 5.370 | 20.322 | 35.679 | 48.691 | 63.056 | 81.487 | 113.068 | 134.996 | 157.340 |
| 140 | 5.781 | 4.536 | 19.402 | 33.930 | 45.799 | 59.417 | 81.141 | 112.473 | 133.924 | 156.189 |

FIG. 5B

SYSTEMS AND METHOD FOR CONTROLLING LUBRICATION

FIELD

The present disclosure generally relates to lubrication. More particularly, the present disclosure relates to systems and method for controlling lubrication.

BACKGROUND

Many modern vehicles, machines, and equipment contain parts that move relative to one another. Over time, friction wears down moving parts, which can lead to increased degradation and decreased efficiency. Various lubricants, such as motor oils, synthetic oils, mineral oils, and so forth, are commonly used to reduce friction. Among other properties, lubricant viscosity can affect how a vehicle, machine, or equipment performs. For example, when a viscosity of a lubricant in an engine is too low, the lubricant may be less effective at reducing friction between moving parts, which may lead to premature wear or failure. Alternatively, when the viscosity of the lubricant is too high, efficiency in the engine may be reduced. Yet, lubricant viscosity may not always be known. For example, it may not be practical or possible to detect lubricant viscosity in certain locations within a vehicle, such as inside pistons of an engine. Further, lubricant viscosity may not be optimized for some operating conditions.

Therefore, there is a need for improved technologies to control lubrication.

SUMMARY

A system for controlling lubrication is provided. In one embodiment, the system includes a temperature control module that controls temperature for a lubricant in a vehicle, and a pressure control module that controls pressure for the lubricant in the vehicle. The system also includes a lubrication controller operatively coupled to the temperature control module and the pressure control module. The lubrication controller receives a temperature from at least one temperature sensor and a pressure from at least one pressure sensor, and determines a viscosity of the lubricant in the vehicle using the temperature, the pressure, and a pressure-temperature-viscosity (PTV) correlation. The lubrication controller also controls lubrication in the vehicle based on the viscosity of the lubricant.

A method for controlling lubrication is also provided. In one embodiment, the method includes receiving a temperature of a lubricant in a vehicle measured using at least one temperature sensor disposed on the vehicle, and receiving a pressure of the lubricant in the vehicle measured using at least one pressure sensor disposed on the vehicle. The method also includes determining a viscosity of the lubricant using the temperature, the pressure, and a pressure-temperature-viscosity (PTV) correlation, and based on the viscosity of the lubricant, controlling lubrication in the vehicle.

BRIEF DESCRIPTION OF THE DRAWINGS

The present disclosure describes various embodiments with reference to the accompanying figures, wherein like reference numerals denote like elements. The embodiments described are presented by way of example, and not by way of limitation, in the accompanying drawings:

FIG. 5A is yet another example of a pressure-temperature-viscosity (PTV) correlation, as described herein; and FIG. 5B is yet another example of a pressure-temperature-viscosity (PTV) correlation, as described herein;

DETAILED DESCRIPTION

Lubrication affects performance in a vehicle, machine, or equipment with moving parts. Unlike conventional approaches, the present disclosure recognizes that a lubricant therein may not be optimized for some operating conditions. Therefore, a technical solution for controlling lubrication is provided herein. As appreciated from description below, the present approach provides a number of benefits and improves a number of technologies, such as vehicle technologies, manufacturing technologies, and many others. For example, the present approach provides actionable data and information regarding performance and maintenance, allows for avoiding catastrophic failures or premature wear, allows for mitigating against unplanned downtime events, and so forth.

Figure 1:
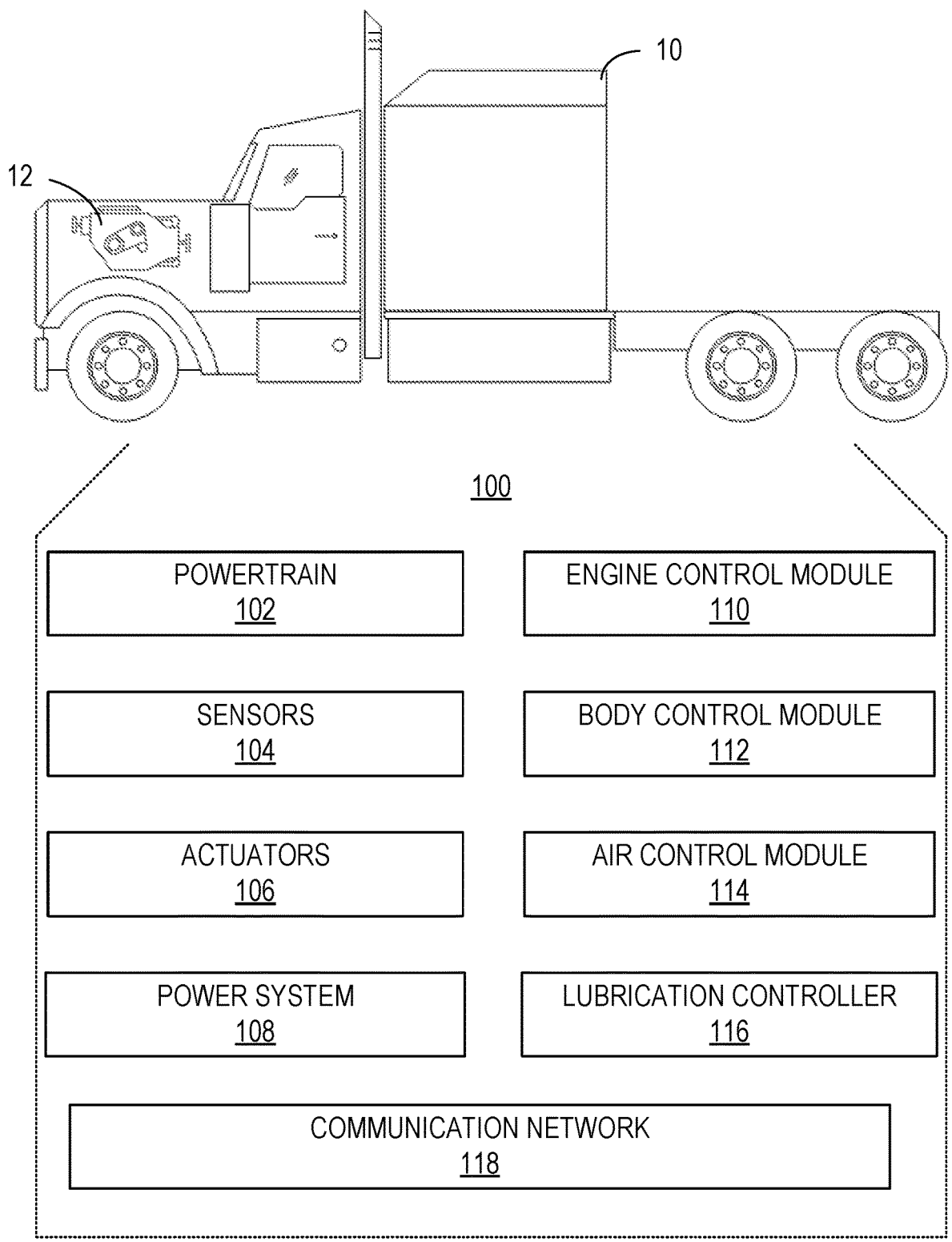
FIG. 1 is a diagram of an example system, as described herein.

FIG. 1 illustrates an example system 100, in accordance with aspects of the present disclosure. In some embodiments, the system 100 may be part of, or incorporated into, a vehicle 10, as shown in FIG. 1. The vehicle 10 may include various types of automobiles, trucks, trailer tractors, utility vehicles, sport utility vehicles (SUVs), recreational vehicles (RVs), as well as boats, planes, drones, trains, and other machines for transporting goods and/or people.

In general, the system 100 may include a vehicle powertrain 102, sensors 104, actuators 106, and a power system 108. The powertrain 102 may include a variety of components, including a vehicle engine 12, transmission, driveshaft, axle, differential and so forth, that together create power and deliver it to wheels of the vehicle 10 to propel the vehicle 10. In some applications, the vehicle 10 is powered by an internal combustion engine. In other applications, the vehicle 10 is powered by electric power provided by one or more electric motors. In yet other applications, the vehicle 10 is powered by a combination of electric and combustion power.

The sensors 104 may include a variety of sensors, including sensing devices configured to provide various useful signals and information about the vehicle 10 and/or vehicle engine 12 operation. In some non-limiting examples, the sensors 104 may include fuel sensors, airflow sensors, coolant sensors, sparkplug sensors, throttle sensors, speed sensors, oxygen sensors, temperature sensors, pressure sensors, voltage sensors, current sensors, and so forth.

The actuator(s) 106 may include various hardware to perform various tasks on the vehicle 10, including regulating fluid flow, moving or energizing components, controlling valves, activating switches, operating gears, and so forth, by way of hydraulic, pneumatic, magnetic or electrical activation or movement of components. In some embodiments, one or more actuators 106 may control lubrication in the vehicle engine 12 by way of controlling various hardware and components that directly or indirectly affect temperature and/or pressure of lubricant in the engine 12. For example, one or more actuators 106 may include and/or control a fan, a heat exchanger, a heater, a valve, a pump, a switch, an electrical circuit or component, and so forth, which may affect flow, pressure, or temperature of a fluid (e.g., lubricant, coolant, etc.), a gas (e.g., air, exhaust, etc.), and so forth.

The power system 108 may include a variety of hardware and components, including one or more batteries, solar panels, starters, alternators, relays, converters, controllers, regulators, switches, solenoids, electrical wiring, electrical circuitry, electrical elements, and so forth. In some embodiments, the power system 108 powers various sensors 104, actuators 106, and other components on the vehicle 10.

Referring again to FIG. 1, the system 100 may also include a number of control modules that perform, manage and monitor various functions of the vehicle 10. For instance, in some embodiments, the system 100 may include an engine control module (ECM) 110, a body control module (BCM) 112, an air control module (ACM) 114, and a lubrication controller 116.

The ECM 110 may control various parameters and functions of the engine 12 of the vehicle 10, including the air-fuel ratio, idle speed, valve timing, ignition timing, crankshaft position, and so forth. To this end, the ECM 110 may include any combination of analog and/or digital inputs and outputs, microprocessors, integrated circuitry, memories, clocks, Application Programming Interfaces (APIs), firmware, software, and so forth, and may communicate with various sensors 104, actuators 106, and other components on the vehicle 10.

The BCM 112 may monitor and control various vehicle body, security, and convenience functions. For instance, the BCM 112 may manage exterior lighting, interior lighting, car locking, remote entry, remote start, windshield wipers, seat adjustment, tire pressure monitoring, and so forth. To this end, the BCM 112 may include various hardware, such as analog and/or digital inputs and outputs, microprocessors, integrated circuitry, programmable circuitry, clocks, batteries, APIs, and so forth, and may communicate with, monitor, and control various components on the vehicle 10. In some embodiments, the BCM 112 may include a memory or a non-transitory computer-readable storage medium for storing and retrieving data, information, and executable instructions. The BCM 112 may operate independently, as well as receive instructions from, or cooperate with, various external computers, systems, or devices.

The ACM 114 may monitor and control various functions and components associated with air flow in the vehicle 10. For instance, in some embodiments, the ACM 114 may control air intake on the vehicle 10 by operating various air control components, such as a fan, a compressor, a turbo, a valve, and so forth.

The lubrication controller 116 may monitor and control lubrication in the vehicle engine 12. To this end, the lubrication controller 116 may include various hardware, such as analog and/or digital inputs and outputs, microprocessors, integrated circuitry, programmable circuitry, clocks, batteries, APIs, and so forth, and may communicate with, monitor, and control various components on the vehicle 10. In some embodiments, the lubrication controller 116 may include a memory or a non-transitory computer-readable storage medium for storing and retrieving data, information, and executable instructions.

In some embodiments, the lubrication controller 116 may receive or access signals or data associated with temperature measured using one or more temperature sensors 104 disposed on or about the vehicle engine 12 or vehicle 10. The lubrication controller 116 may also receive or access signals or data associated with pressure measured using one or more pressure sensors 104 disposed on or about the vehicle engine 12 or vehicle 10. The lubrication controller 116 may then determine a viscosity of lubricant in the vehicle engine 12 or vehicle 10 using temperature, pressure, and a pressure-temperature-viscosity (PTV) correlation associated with the vehicle engine 12 or vehicle 10. Viscosity determined by the lubrication controller 116 may include dynamic viscosity, absolute viscosity, kinematic viscosity, and so forth. In some embodiments, the lubrication controller 116 may obtain a PTV correlation by accessing and/or retrieving the PTV correlation from a memory, a database, or any other storage medium associated with, or external to, the vehicle engine 12 or vehicle 10. As described in further detail below, a PTV correlation may be in the form of a look-up table, a graph, a chart, a diagram, a model, a data structure or object, library, and so forth, and relate various pressure, temperature, and viscosity values.

In some implementations, the lubrication controller 116 may track over a period of time temperature, pressure, viscosity (and other properties) of lubricant in the vehicle 10 to determine and/or predict a condition of the lubricant, of the vehicle engine 12, of the vehicle 10, or a combination thereof. By way of example, the lubrication controller 116 may identify use or degradation patterns (e.g., normal, abnormal, etc.), contamination events (e.g., low, medium, high, etc.), bypass or leak situations, filter plugging, and so forth.

In some embodiments, the lubrication controller 116 may compare viscosity, determined in accordance with the present disclosure, to a reference. Based on the comparison, the lubrication controller 116 may control lubrication. For example, the lubrication controller 116 may determine a viscosity of lubricant in vehicle engine 12 to be below a predetermined viscosity value that is desirable, sufficient, or optimal for operating the vehicle engine 12. The lubrication controller 116 may then generate and provide a control signal (e.g., to one or more actuators 106 and/or control modules in the vehicle 10) to change one or more conditions (e.g., temperature, pressure, or both) in the vehicle engine 12, such that the viscosity of the lubricant is modified to be close to the predetermined viscosity value (e.g., within a tolerance between 0.1% to 10% of the predetermined viscosity value) or to exceed the predetermined viscosity value. In another example, a viscosity of the lubricant may be determined to be above the predetermined viscosity value. The lubrication controller 116 may then generate and provide a control signal to change one or more conditions in the vehicle engine 12, such that the viscosity of the lubricant is modified to be close to or below the predetermined viscosity value. In yet another example, a viscosity may be determined to be outside a predetermined viscosity range that is desirable, sufficient, or optimal for operating the vehicle engine 12. The lubrication controller 116 may then generate and provide a control signal to change one or more conditions in the vehicle engine 12, such that the viscosity of the lubricant is modified to return to the predetermined viscosity range.

In one embodiment, the lubrication controller 116 may generate and transmit a temperature control signal to one or more actuators 106 and/or various control modules disposed on the vehicle 10. Responsive to the temperature control signal, the actuator(s) 106 and/or control module(s) may initiate or cease an action to control lubricant temperature. In one example, an actuator 106 may control a power or a setting on a heater or a fan on the vehicle engine 12. In another example, an actuator 106 may control flow of fluid (e.g., lubricant, coolant, and so forth). For instance, the actuator 106 may control whether fluid goes through a heat exchanger on the vehicle engine 12. In one embodiment, the lubrication controller 116 may generate and transmit a pressure control signal to one or more actuator(s) 106 and/or control various modules disposed on the vehicle 10. Responsive to the pressure control signal, the actuator(s) 106 and/or control module(s) may initiate or cease an action to control lubricant pressure. In one example, an actuator may control a power, configuration, or gear of a pump (e.g., oil pump, water pump, and so forth) on the vehicle engine 12. In another example, an actuator 106 may control a configuration of a valve (e.g., a relief valve) on the vehicle engine 12. In yet another example, an actuator 106 may control flow of lubricant, for instance, through a manifold, an impedance, a conduit, a nozzle, and so forth.

In some embodiments, the lubrication controller 116 may generate and provide a report. The report may be in any form, and include various data and information, including various visual and/or audio signals, images, graphics, tabulated information, data, instructions (user-readable or machine-readable), graphs, lists, numbers, text, and so forth. For example, the report may include data and/or information indicative of a condition or property of lubricant in a vehicle engine 12 (e.g., temperature, pressure, viscosity, remaining useful life, etc.), a condition of the vehicle engine 12, a condition of a component in the vehicle 10 (e.g., filter, lubricant, etc.), a maintenance or replacement recommendation, and so forth. The report may be communicated to one or more users by way of a display, touchscreen, navigation system, speaker, and other outputs on the vehicle 10, as well as transmitted to various devices, systems, or third parties. For example, the report may be streamed, printed, faxed, emailed, and so forth. The report may be provided in real-time, intermittently, periodically (e.g., hourly, daily, weekly, monthly, and so forth), or any combination thereof. The report may also be saved in a storage medium (e.g., a memory, a database, a server, etc.) for later access or retrieval.

Components of the system 100 may be operatively coupled, connectable, or connected to one another, and exchange signals, data, and information, by way of a communication network 118. The communication network 118 may include a variety of hardware and components that provide wired and wireless connectivity via various communication protocols. Non-limiting examples of communication protocols include Control Area Network (CAN), Local Interconnect Network (LIN), Flex-Ray, Vehicle Area Network (VAN), Media Oriented System Transport (MOST), Bluetooth™, Wi-Fi, and so forth. In some embodiments, the communication network 118 may include one or more vehicle buses that interconnect components and hardware in the system 100. The communications network 118 may also include various gateways, bridges, receivers, transmitters, transceivers, antennas, and other components, circuitry and hardware that facilitate communication.

Although specific components are shown and described with reference to FIG. 1, the system 100 may include more or fewer components, and may also integrate or separate tasks for monitoring and/or controlling the vehicle 10. For instance, in some embodiments, the system 100 may include modules for brake control, climate control, transmission control, and so on. Also, in some embodiments, the system 100 may include a number of input/output (I/O) modules or components, such as buttons, dials, knobs, touchscreens, keyboards, monitors, screens, panels, displays, buzzers, speakers, and so forth, that can receive instructions or input from a user, and provide data, information, instructions, and other outputs to an operator or driver.

Figure 2:
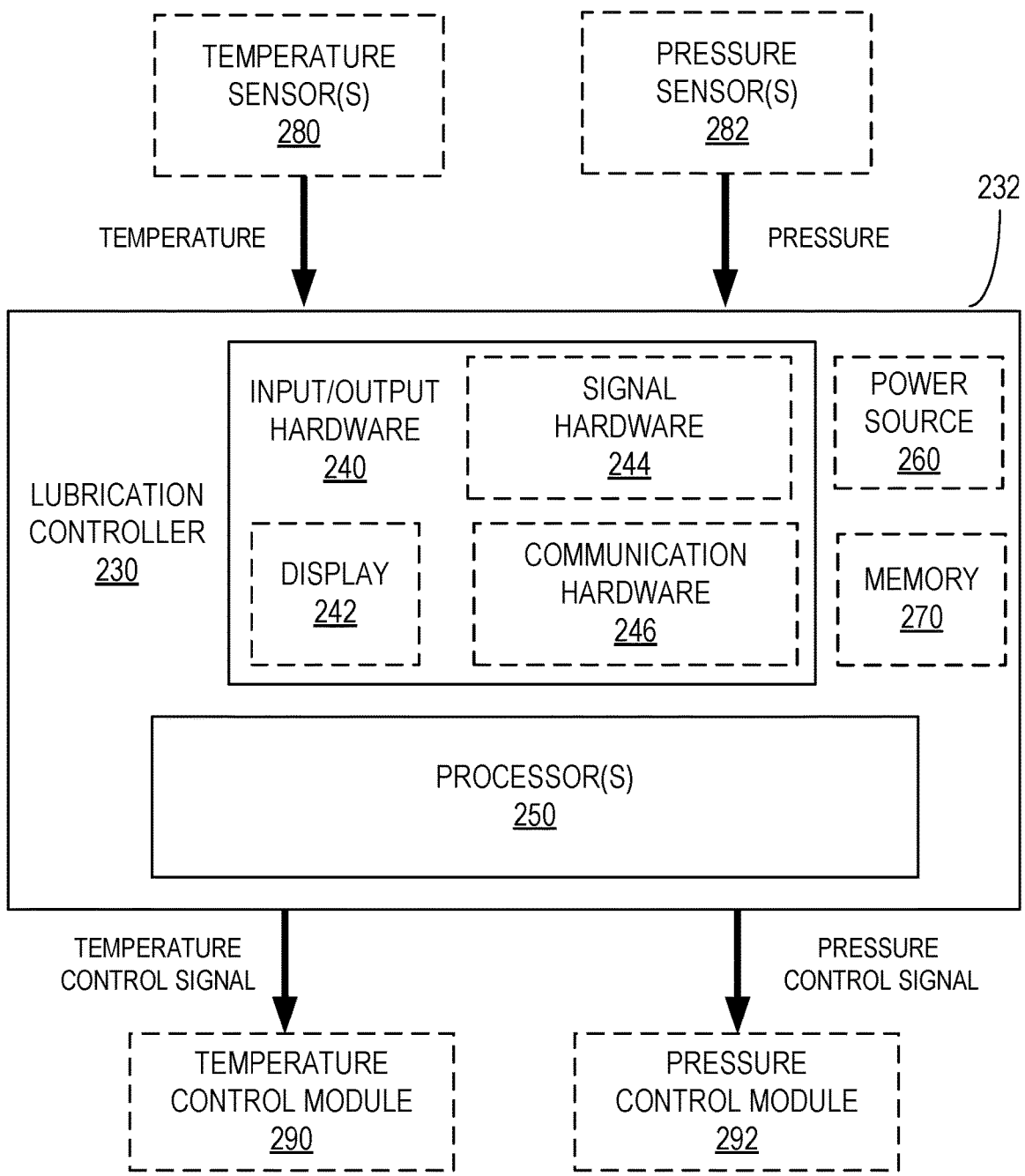
FIG. 2 is a diagram of another example system, as described herein.

Turning now to FIG. 2, an example system 200 for controlling lubrication, in accordance with aspects of the present disclosure, is provided. The system 200 may generally include a lubrication controller 230 with a housing 232 that may include various I/O hardware 240 and one or more processors 250.

The I/O hardware 240 may include various input and output elements that can receive, transmit, and provide various data, information, and instructions. Example input elements are buttons, microphones, dials, knobs, touchscreens, keyboards, connectors, and so forth. Example output elements are monitors, screens, panels, displays, buzzers, speakers, lights, and so forth. In some embodiments, the I/O hardware 240 may include a display 242 that can provide various reports, data, or information to an operator or driver. For instance, the display 256 may provide a report indicative of a condition or property of lubricant in an engine (e.g., temperature, pressure, viscosity, remaining useful life, and so forth), a condition of an engine, a condition of a component in a vehicle or engine (e.g., filter, lubricant, and so forth), and so forth. Although FIG. 2 shows the display 242 to be inside the housing 232 of the lubrication controller 230, in some embodiments, the display 242 may be external to the housing 232. For instance, the display 242 may be associated with, or part of, a dashboard, a navigation system, a head-up display, a console, a readout, and so forth, on a machine, a vehicle, or any other type of equipment.

In some embodiments, as illustrated in FIG. 2, the I/O hardware 240 may include various signal hardware 244 that can acquire, sample, transform, receive, transmit, process, and/or generate various signals, data, and information. Non-limiting examples include data loggers, recorders, signal converters (e.g., analog-to-digital, digital-to-analog, voltage, frequency, voltage-to-frequency, frequency-to-voltage, current-to-voltage, voltage-to-current etc.), signal conditioners (e.g., amplifiers, attenuators, filters, inverters, choppers, etc.), signal generators, relays, busses, switches, circuitry, interfaces, boards, clocks, and so forth. In some embodiments, the I/O hardware 240 may include various communication hardware 244 that can facilitate communication of signals, data, and information between components of the lubrication controller 230, as well as between the lubrication controller 230, and components therein, and external sensors, devices, modules, systems, and so forth. Non-limiting examples include connectors, ports, circuitry, adapters, interface cards, network cards, busses, circuitry, transmitters, receivers, transceivers, antennas, modulators, modes, and so forth.

The processor(s) 250 may carry out a variety of steps for operating the system 200, such as accessing, processing, receiving, transmitting, and/or storing various signals, data, and information. To do so, the processor(s) 250 may include or utilize one or more programmable processors that can execute instructions or sequences of instructions. Such communicated to the processor(s) 250, or accessed by the processor(s) 250 from, for instance, a memory, database, or other data storage location(s). Alternatively, or additionally, the processor(s) 250 may include one or more dedicated processors, processing units, devices, modules, or systems specifically configured to (e.g., hardwired, or pre-programmed) carry out such tasks and steps. By way of example, the processor(s) 250 may include any combination of central processing units (CPUs), graphics processing units (GPUs), Digital Signal Processing (DSP) chips, Application Specific Integrated Circuits (ASICs), Field Programmable Gate Arrays (FPGAs), microprocessors, integrated circuitry, programmable circuitry, and so forth.

As illustrated in FIG. 2, the lubrication controller 230 may optionally include a power source 260 (e.g., a battery) inside the housing 232 to power various components of the lubrication controller 230. Additionally, or alternatively, the lubrication controller 230 may connected to and receive external power from an external source, such as vehicle 10 described with reference to FIG. 1. In some embodiments, the power source 260 may include various hardware for adapting, storing, and/or delivering power to various components in the lubrication controller 230.

The lubrication controller 230 may optionally include a memory 270 for storing various data, information, and/or instructions. In some embodiments, the memory 270 may include a non-transitory computer-readable medium, such as a random access memory (RAM), a non-volatile (NV) memory, and so forth. The non-transitory computer-readable medium may store instructions for controlling lubrication, in accordance with aspects of the present disclosure.

The system 200 may include various sensors, devices, and other hardware, operably coupled, connectable, or connected (e.g., via wired and/or wireless connectivity) to the lubrication controller 230. For instance, in some embodiments, the system 200 may optionally include one or more temperature sensors(s) 280 operably coupled, connectable, or connected to the lubrication controller 230. Temperature sensor(s) 280 may be installed or included in various vehicles, machines, equipment, or components thereof, to provide various signals and/or data associated with temperature, including temperature of lubricant therein. In some embodiments, the system 200 may optionally include one or more pressure sensor(s) 282 operably coupled, connectable, or connected to the lubrication controller 230. Pressure sensor(s) may be installed or included in various vehicles, machines, equipment, or components thereof, to provide various signals and/or data associated with pressure, including temperature of lubricant therein.

In some embodiments, the system 200 may optionally include a temperature control module 290 operatively coupled, connectable, or connected to the lubrication controller 230. The temperature control module 290 may control temperature in a vehicle, machine, equipment, or component thereof, such that a temperature of lubricant therein may be controlled. For instance, responsive to a temperature control signal generated and provided by the lubrication controller 230, the temperature control module 290 may initiate or cease an action that controls lubricant temperature. In one example, the temperature control module 290 may control a power or a setting on a heater or a fan. In another example, the temperature control module 290 may control a flow of fluid (e.g., lubricant, coolant, and so forth). For instance, the temperature control module 290 may control whether fluid goes through a heat exchanger on a vehicle.

In some embodiments, the system 200 may include a pressure control module 292 operatively coupled, connectable, or connected the lubrication controller 230, where the temperature control module 290 controls a pressure in a vehicle, machine, equipment, or component thereof, such that a pressure of lubricant therein may be controlled. For instance, responsive to a pressure control signal generated and provided by the lubrication controller 230, the pressure control module 292 may initiate or cease an action that controls lubricant pressure. In one example, the pressure control module 292 may control a power, configuration, or gear of a pump (e.g., oil pump, water pump, and so forth). In another example, the pressure control module 292 may control a configuration of a valve (e.g., a relief valve). In yet another example, the pressure control module 292 may control a flow of lubricant, for instance, through a manifold, an impedance, a conduit, a nozzle, and so forth. Although the pressure control module 292 and temperature control module 290 are illustrated in FIG. 2 outside the housing 232 of the lubrication controller 230, in some embodiments, either module, or both modules, may be inside the housing 232.

In some embodiments, the processor(s) 250 may carry out steps to control lubrication in accordance with the present disclosure. In some implementations, the processor(s) 250 may initiate and/or control measurement or acquisition of signals produced by various devices or sensors, such as, signals produced by temperature sensor(s) 280 and/or pressure sensor(s) 282. For example, the processor(s) 250 may direct the signal hardware 244 to sample signals from the temperature sensor(s) 280 and/or pressure sensor(s) 282 at a predetermined sampling rate, for a predetermined amount of time, at one or more predetermined times or time intervals, or any combination thereof. In some implementations, the processor(s) 250 may receive signals sampled by the signal hardware 244, may process the received signals, and/or may store the processed signals as data. For example, temperature and/or pressure signals sampled by the signal hardware 244 from output produced by the temperature sensor(s) 280 and/or pressure sensor(s) 282 may be processed by filtering, averaging, detrending, amplifying, scaling, and so forth, and saved in a digital format (e.g., in memory 270, as well as elsewhere) as temperature data and/or pressure data.

In some implementations, the processor(s) 250 may determine a viscosity (e.g., dynamic viscosity, absolute viscosity, kinematic viscosity, and so forth) of a lubricant in a vehicle, machine, equipment, or component thereof. To do so, the processor(s) 250 may utilize various temperature, pressure, and PTV correlation data associated with the vehicle, machine, equipment, or component thereof. In some implementations, the processor(s) 250 may retrieve or access temperature, pressure, and PTV correlation data from a storage location, such as memory 270, or elsewhere. As described in further detail below, a PTV correlation may include various data in the form of a look-up table, a graph, a chart, a diagram, a model, a data structure or object, library, and so forth, and relate various pressure, temperature, and viscosity values. Using temperature and pressure values and PTV correlation, the processor(s) 250 may identify one or more viscosity values corresponding to the temperature and pressure values.

In some implementations, the processor(s) 250 may compare a viscosity to a reference. Based on the comparison, the processor(s) 250 may control lubrication. For example, the processor(s) 250 may determine a viscosity of a lubricant in a vehicle, machine, equipment, or component thereof to be below a predetermined viscosity value that is desirable, sufficient, or optimal for operating a vehicle, machine, equipment, or component thereof. The processor(s) 250, alone or in cooperation with the signal hardware 244, may then generate and provide one or more control signals to change one or more conditions (e.g., temperature, pressure, or both) in the vehicle, machine, equipment, or component thereof.

For example, the processor(s) 250 and/or signal hardware 244 may generate and provide a temperature control signal to the temperature control module 290 controlling temperature in the vehicle, machine, equipment, or component thereof. Alternatively, or additionally, the processor(s) 250 and/or signal hardware 244 may generate and provide a pressure control signal to the pressure control module 292 controlling pressure in the vehicle, machine, equipment, or component thereof. Resulting from action by the temperature control module 290 and/or pressure control module 292, the viscosity of the lubricant may be modified to be close to the predetermined viscosity value (e.g., within a tolerance between 0.1% to 10% of the predetermined viscosity value) or to exceed the predetermined viscosity value.

In another example, a viscosity of the lubricant may be determined to be above the predetermined viscosity value. The processor(s) 250 and/or signal hardware 244 may then generate and provide one or more control signals to change one or more conditions, such that the viscosity of the lubricant is modified to be close to or below the predetermined viscosity value. In yet another example, a viscosity may be determined to be outside a predetermined viscosity range that is desirable, sufficient, or optimal for operation. The processor(s) 250 and/or signal hardware 244 may then generate and provide one or more control signals to change one or more conditions, such that the viscosity of the lubricant is modified to return to the predetermined viscosity range.

In some scenarios, pressure and temperature measurements may be in sync with parameters of a vehicle, machine, equipment, or component thereof, such that direct measurement of viscosity (e.g., via a viscosity sensor) can differ from viscosity determined by the processor(s) 250, in accordance with aspects of the present disclosure. This may be due to lubricant dilution by fuel, coolant, water, or other external factors, and can lead to a number of issues, such as filter medium collapse. And so, based on a comparison between determined viscosity and measured viscosity, any number of actions may be taken by the processor(s) 250. For example, the processor(s) 250 may generate a report indicating a difference between measured and determined viscosity, a recommendation for maintenance, a recommendation for root cause analysis, and so forth.

In some implementations, the processor(s) 250 may track over a period of time temperature, pressure, and/or viscosity (as well as other parameters) of a lubricant, to determine and/or predict a condition of the lubricant, and/or of the vehicle, machine, equipment, or component thereof, in which the lubricant is used. In one non-limiting example, one or more temperature measurements may be too high (e.g., exceeding a predetermined value or range of values), resulting in a lower lubricant viscosity, and leading to reduced mechanical durability or failure of moving parts due to reduced or loss of lubricant coverage. Hence, in some implementations, the processor(s) 250 may analyze a set of temperature and/or pressure measurements, and extrapolate such temperature and/or pressure measurements to determine a point in time and/or temperature/pressure value indicative of reduced mechanical durability and/or failure. The processor(s) 250 may accordingly initiate action, such as generating and providing one or more control signals, in accordance with aspects of the present disclosure. In particular, the processor(s) 250 may manipulate temperature and/or pressure to modify a viscosity of a lubricant (e.g., a multi-viscosity lubricant) to avoid or delay the occurrence of the determined point in time and/or temperature/pressure value indicative of reduced mechanical durability and/or failure.

Figure 3:
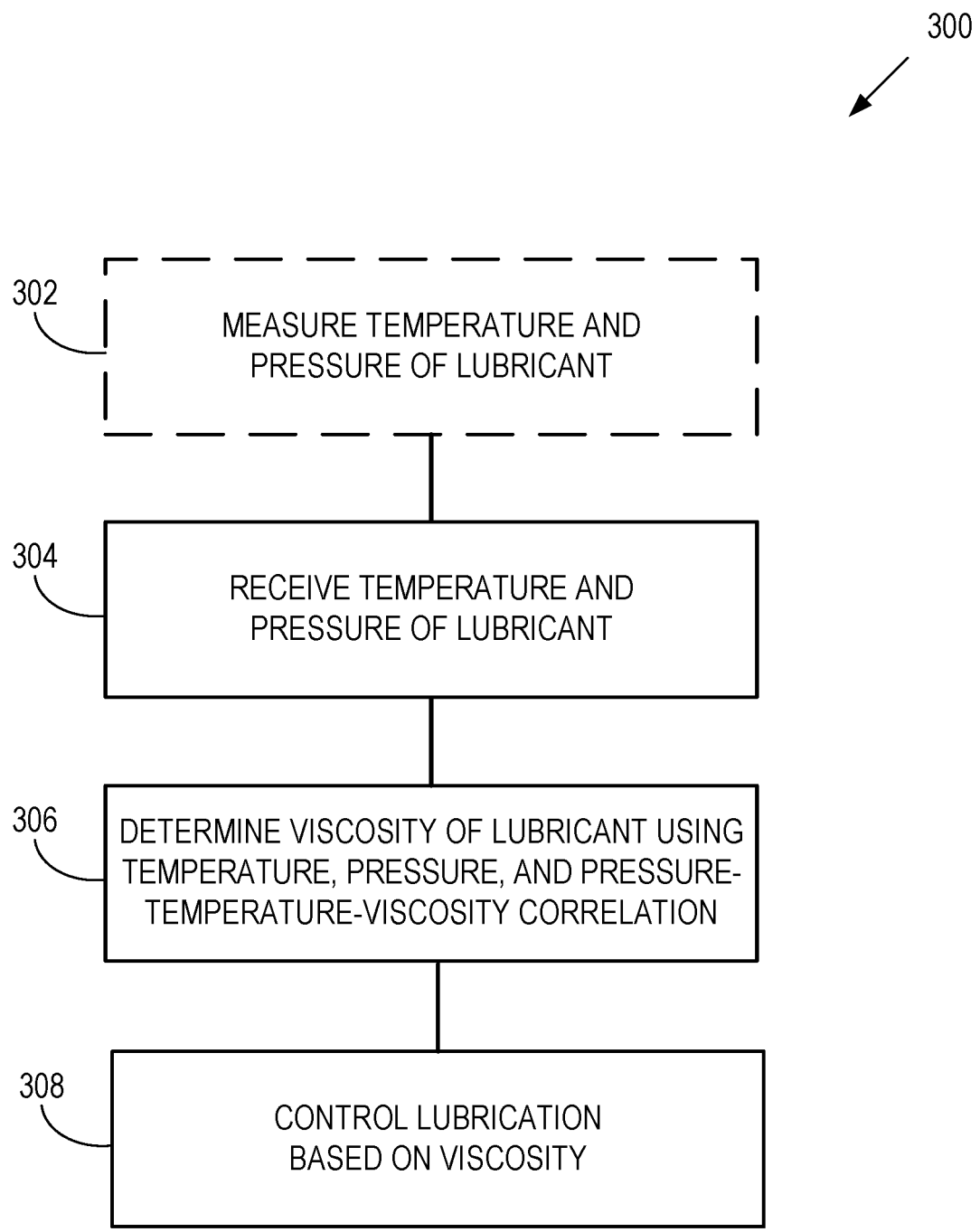
FIG. 3 is a flowchart setting forth steps of a process, as described herein.

Turning now to FIG. 3, a flowchart setting forth steps of a process 300, in accordance with aspects of the present disclosure, is illustrated. Steps of the process 300 may be carried out using any combination of suitable devices or systems, as well as using systems described in the present disclosure. In some embodiments, steps of the process 300 may be implemented as instructions stored in non-transitory computer readable media, as a program, firmware, or software, and executed by a general-purpose, programmed or programmable, computer, processor, or any other computing device. In other embodiments, steps of the process 300 may be hardwired in an application-specific computer, processer, or dedicated system or module as described with reference to FIGS. 1 and 2. Although the process 300 is illustrated and described as a sequence of steps, it is contemplated that the steps may be performed in any order or combination. The process 300 need not include all of the illustrated steps, and in some implementations may include other or additional steps.

The process 300 may optionally begin at process block 302 with measuring temperature and/or pressure of a lubricant. As described herein, lubricant may be utilized in a variety of vehicles, machines, equipment, or components thereof. As such, temperature and/or pressure may be measured at process block 302 using a variety of sensors, devices, or systems. For example, as described with reference to FIG. 1, temperature and/or pressure may be measured using one or more temperature sensors 104 disposed on or about a vehicle engine 12, and/or one or more pressure sensors 104 disposed on or about the vehicle engine 12.

Temperature and pressure may then be received, as indicated by process block 304. For example, as described with reference to FIG. 2, a lubrication controller 250 may receive temperature and/or pressure from various sensors, devices, or other signal detection hardware, such as temperature sensor(s) 280 and/or pressure sensor(s) 282. In some implementations, temperature and/or pressure may be received upon measurement. For instance, real-time signals output by the various sensors, devices, or other signal detection hardware, may be sampled at a predetermined rate, for a predetermined amount of time, at one or more predetermined times or time intervals, or any combination thereof, for example, using signal hardware 244 described with reference to FIG. 2. In some implementations, temperature and pressure may be measured concomitantly, such that at least one temperature measurement and at least one pressure measurement are associated with a specific point in time or acquired within a short window of time (e.g., less than 10 seconds, less than 5 seconds, less than 1 second, etc.) In some implementations, temperature and/or pressure may be received at process block 304 by accessing data from a storage medium. For example, lubrication controller 250 may receive temperature data and/or pressure data from memory 270.

In some implementations, temperature and pressure signals or data received at process block 304 may also be processed, for example, by filtering, averaging, detrending, amplifying, scaling, and so forth. Raw and/or processed signals or data may also be saved in a digital format (e.g., in memory 270, as well as elsewhere) as temperature data and/or pressure data. In some implementations, other data, or information may be measured, received, or accessed at process blocks 302, 304, such as data and information related to the lubricant, data and information related to a vehicle, machine, equipment, or component(s) using the lubricant, data and information related to one or more operating conditions of the vehicle, machine, equipment, or component(s) thereof, and so forth.

Then, at process block 306, a viscosity of the lubricant may be determined using temperature, pressure, and a PTV correlation, which relates various temperature, pressure, and viscosity values. As illustrated in FIGS. 4A-4C, and FIGS. 5A-5B, the PTV correlation may take various forms, such as a look-up table, a graph, a chart, a diagram, a model, a data structure or object, library, and so forth. The PTV correlation may include various other data and information, such as data and information related to the lubricant, data and information related to a vehicle, machine, equipment, or component (s) using the lubricant, data and information related to one or more operating conditions of the vehicle, machine, equipment, or component(s) thereof, and so forth.

Figure 4A:
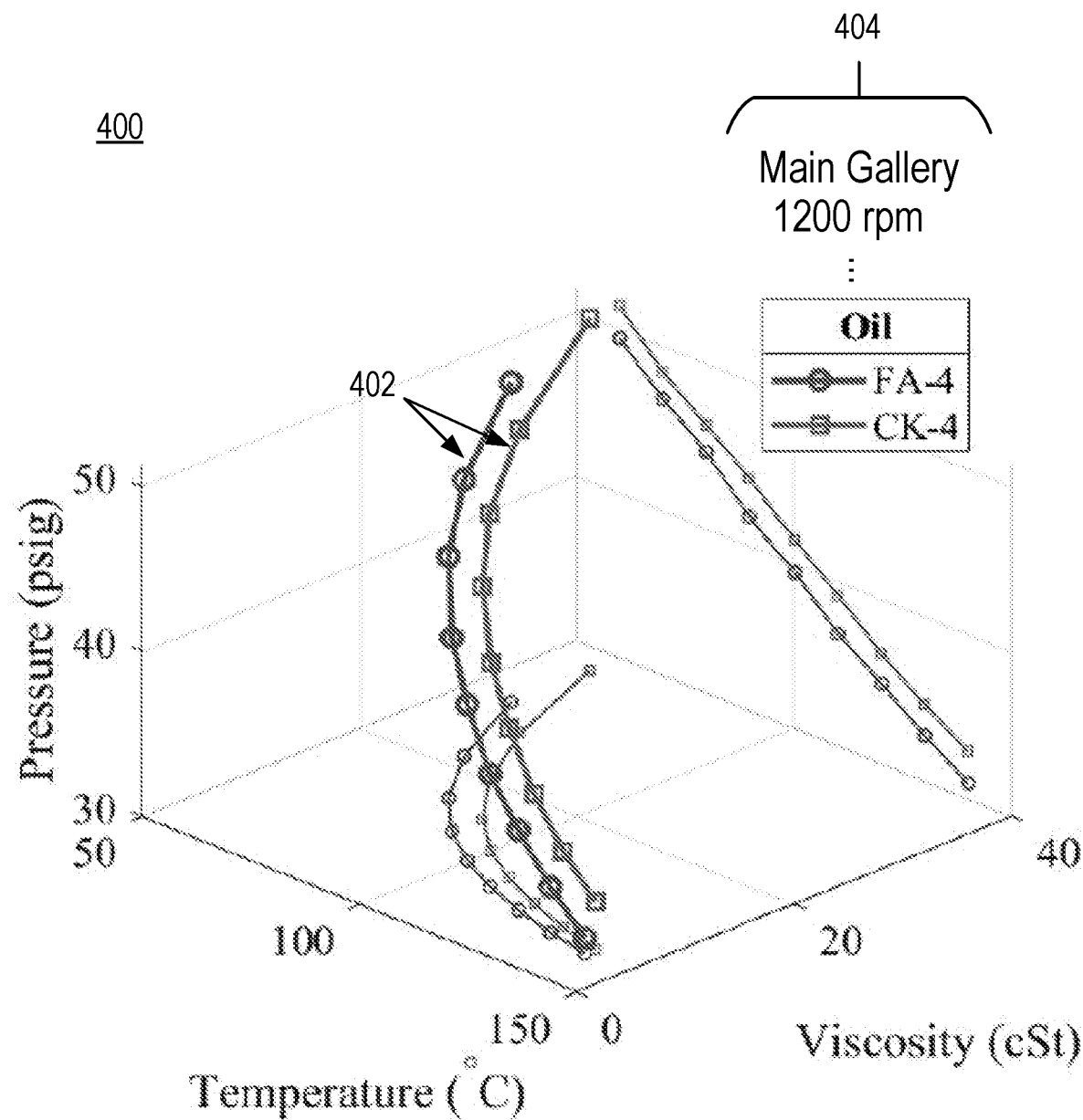
FIG. 4A is an example of a pressure-temperature-viscosity (PTV) correlation, as described herein.
Figure 4C:
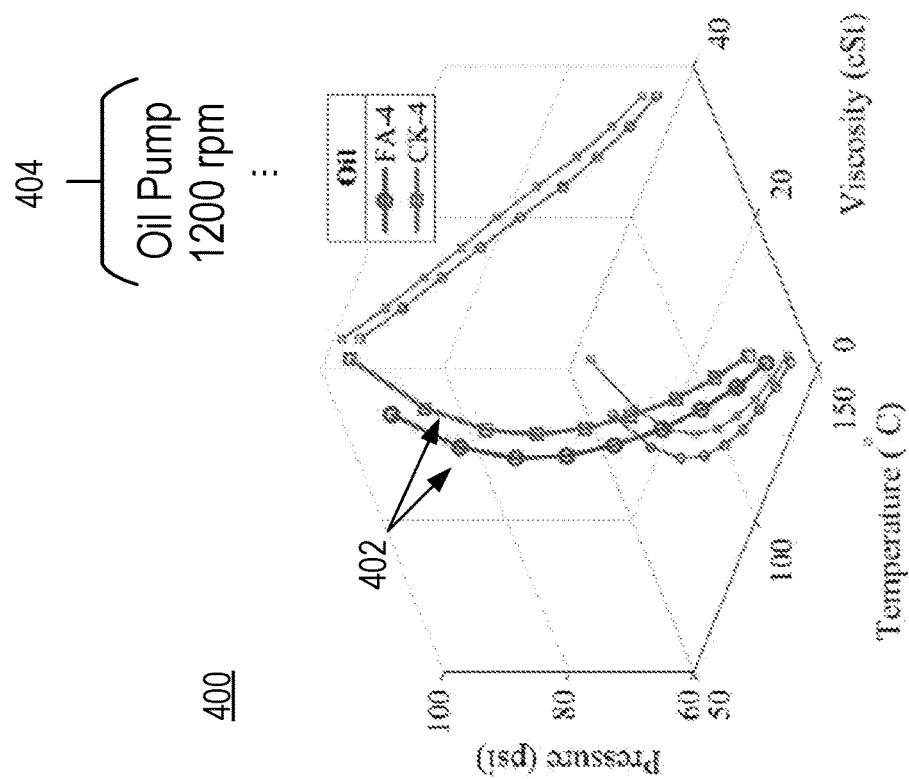
FIG. 4C is yet another example of a pressure-temperature-viscosity (PTV) correlation, as described herein.
Figure 4B:
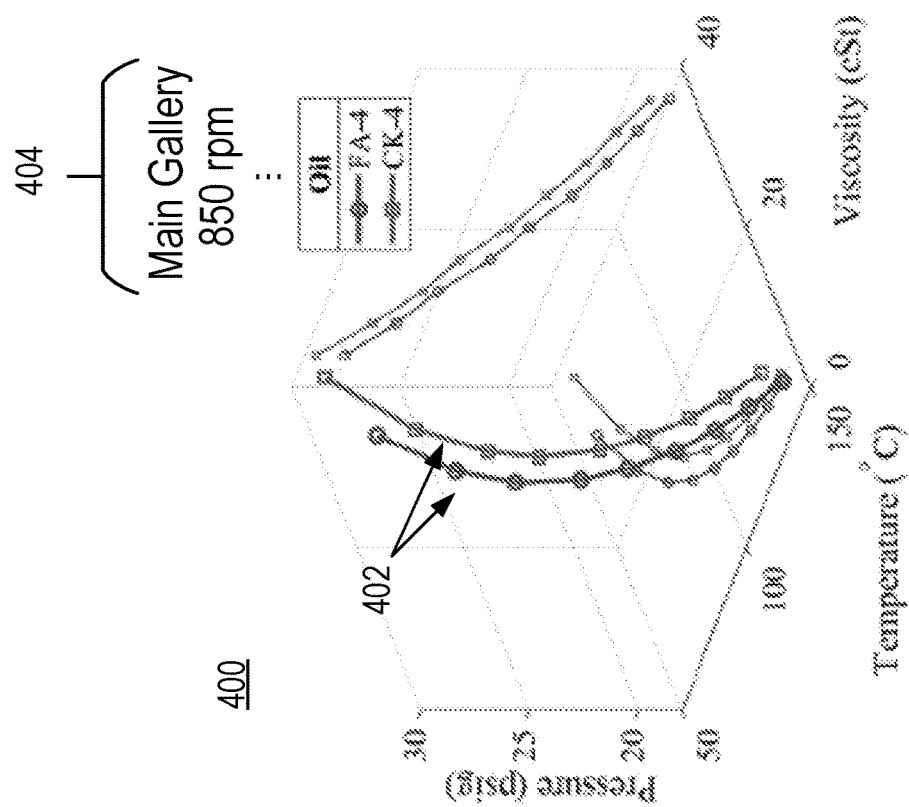
FIG. 4B is another example of a pressure-temperature-viscosity (PTV) correlation, as described herein.

By way of example, FIG. 4A illustrates a PTV correlation 400 in a graphical form, and more particularly, depicting two three-dimensional relationships 402 between pressure, temperature, and viscosity values. As shown in a text field 404 associated with the PTV correlation 400, each relationship 402 may correspond to a certain lubricant (i.e., "FA-4" and "CK-4"), a certain location or component on an engine (i.e., "Main Gallery"), and a certain operation condition of the engine (i.e., "1200 rpm"). Of course, the relationships 402, lubricants, location/components, or operating condition in the PTV correlation 400 may vary. For example, relationships 402 may be different for a different operating condition (i.e., "850 rpm," as illustrated in FIG. 4B), or a different location or component on the engine (i.e., "Oil Pump," as illustrated in FIG. 4C). In other examples illustrated in FIGS. 5A and 5B, a PTV correlation may be in a tabular form, and include various fields and values, such as temperature, pressure, viscosity (e.g., kinematic, dynamic, etc.), flow rate, engine speed, lubricant type, (e.g., FA-4, CK-4, etc.), as well as other data and information.

Referring again to FIG. 3, in some implementations, the PTV correlation used at process block 306 may correspond to a specific vehicle, machine, equipment, or component thereof, in which the lubricant is used. As such, the PTV correlation may be stored in, and accessed from, a memory or other storage location associated with the specific vehicle, machine, equipment, or component thereof. For example, a PTV correlation may be stored in memory 270 described with reference to FIG. 2. In other implementations, the PTV correlation may be programmed or hardwired in a processor, module, device, hardware, and so forth, via firmware, software, and so forth.

Viscosity may be determined at process block 306 by identifying one or more viscosity values corresponding to values of temperature and pressure received at process block 304. As appreciated from the above examples, other data and information may be utilized, such as data and information related to the lubricant, data and information related to a vehicle, machine, equipment, or component(s) using the lubricant, data and information related to one or more operating conditions of the vehicle, machine, equipment, or component(s) thereof, and so forth.

Lubrication may then be controlled based on determined viscosity, as indicated by process block 308. To control lubrication, one or more control signals may be generated and sent to hardware that controls at least one condition affecting lubricant viscosity. For instance, in one implementation, a temperature control signal may be generated and sent by a lubrication controller 250 and/or signal hardware 244 to a temperature control module 290, as described with reference to FIG. 2. Responsive to the temperature control signal, a temperature of the lubricant may be modified or maintained. In another implementation, a pressure control signal may be generated and sent by a lubrication controller 250 and/or signal hardware 244 to a pressure control module 292, as described with reference to FIG. 2. Responsive to the pressure control signal, a pressure of the lubricant may be modified or maintained.

In some implementations, a comparison to a reference may be made at process block 308, and the control signal(s) may be generated based on the comparison. For instance, if viscosity is determined at process block 308 to be below a predetermined viscosity value that is desirable, sufficient, or optimal for operating a vehicle, machine, equipment, or component thereof, one or more control signals may be generated and provided to change one or more conditions (e.g., temperature, pressure, or both) in the vehicle, machine, equipment, or component thereof, such that the viscosity of the lubricant may be modified to be close to the predetermined viscosity value (e.g., within a tolerance between 0.1% to 10% of the predetermined viscosity value) or to exceed the predetermined viscosity value.

In another example, if viscosity of the lubricant is determined to be above the predetermined viscosity value, one or more control signals may be generated and provided to change one or more conditions, such that the viscosity of the lubricant is modified to be close to or below the predetermined viscosity value. In yet another example, if viscosity is determined to be outside a predetermined viscosity range that is desirable, sufficient, or optimal for operation, one or more control signals may be generated and provided to change one or more conditions, such that the viscosity of the lubricant is modified to return to the predetermined viscosity range.

Steps of the process 300 may be repeated continuously, periodically, or intermittently. In this manner, temperature, pressure, viscosity (and other parameters) of the lubricant may be tracked over time, and used to determine and/or predict a condition of the lubricant, and/or of the vehicle, machine, equipment, or component thereof, as described.

In some implementations, a report may be generated and provided at various steps of process 300. The report may be in any form, and include various data and information, including various visual and/or audio signals, images, graphics, tabulated information, data, instructions (user-readable or machine-readable), graphs, lists, numbers, text, and so forth. For example, the report may include data and/or information indicative of a condition or property of the lubricant (e.g., temperature, pressure, viscosity, remaining useful life, etc.), a condition of the vehicle, machine, equipment, or component thereof, a maintenance or replacement recommendation, and so forth. The report may be communicated to one or more users by way of a display, touchscreen, navigation system, speaker, and other, as well as transmitted to various devices, systems, or third parties. For example, the report may be streamed, printed, faxed, emailed, and so forth. The report may be provided in continuously in real-time, intermittently, periodically (e.g., hourly, daily, weekly, monthly, and so forth), or any combination thereof. The report may also be saved in a storage medium (e.g., a memory, a database, a server, etc.) for later access or retrieval.

According to one embodiment, the system for controlling lubrication includes a temperature control module that controls temperature for a lubricant in a vehicle, and a pressure control module that controls pressure for the lubricant in the vehicle. The system also includes a lubrication controller operatively coupled to the temperature control module and the pressure control module, wherein the lubrication controller receives a temperature from at least one temperature sensor and a pressure from at least one pressure sensor, and determines a viscosity of the lubricant in the vehicle using the temperature, the pressure, and a pressure-temperature-viscosity (PTV) correlation. The lubrication controller also controls lubrication in the vehicle based on the viscosity of the lubricant. In one embodiment, the lubrication controller obtains the PTV correlation from a memory associated with the vehicle, and the PTV correlation relates pressure, temperature, and viscosity values for the lubricant in the vehicle. In another embodiment, the lubrication controller performs a comparison to determine whether the viscosity is within a predetermined viscosity range or whether the viscosity differs from a predetermined value. In yet another embodiment, the lubrication controller, based on the comparison, sends a temperature control signal to the temperature control module, and responsive to the temperature control signal, the temperature control module modifies or maintains the temperature of the lubricant to control lubrication. In yet another embodiment, the lubrication controller, based on the comparison, sends a pressure control signal to the pressure control module, and responsive to the pressure control signal, the pressure control module modifies or maintains the pressure of the lubricant to control lubrication. In yet another embodiment, the lubrication controller tracks the viscosity over a period of time to determine a condition of the lubricant, the vehicle, or both. In yet another embodiment, the lubrication controller generates a report indicative of the condition of the lubricant, the vehicle, or both.

According to another embodiment, a method for controlling lubrication includes receiving a temperature of a lubricant in a vehicle measured using at least one temperature sensor disposed on the vehicle, and receiving a pressure of the lubricant in the vehicle measured using at least one pressure sensor disposed on the vehicle. The method also includes determining a viscosity of the lubricant using the temperature, the pressure, and a pressure-temperature-viscosity (PTV) correlation, and based on the viscosity of the lubricant, controlling lubrication in the vehicle. In one embodiment, the method further comprises measuring the temperature and the pressure concomitantly. In another embodiment, the method further comprises obtaining the PTV correlation from a memory associated with the vehicle, wherein the PTV correlation relates pressure, temperature, and viscosity values for the lubricant in the vehicle. In yet another embodiment, the method further comprises performing a comparison to determine whether the viscosity is within a predetermined viscosity range or whether the viscosity differs from a predetermined viscosity value. In yet another embodiment, the method further comprises sending a temperature control signal to a temperature control module based on the comparison, and responsive to the temperature control signal, modifying or maintaining the temperature of the lubricant using the temperature control module. In yet another embodiment, the method further comprises sending a pressure control signal to a pressure control module based on the comparison, and responsive to the pressure control signal, modifying or maintaining the pressure of the lubricant using the pressure control module. In yet another embodiment, the method further comprises tracking the viscosity over a period of time to determine a condition of the lubricant, the vehicle, or both. In yet another embodiment, the method further comprises generating a report indicative of the condition of the lubricant, the vehicle, or both.

While the present disclosure has described a number of embodiments and implementations, the disclosure is not so limited and may cover various modifications and equivalent arrangements, which fall within the purview of the appended claims. Although certain features are expressed in certain combinations among the claims, it is contemplated that these features can be arranged in any combination and order. It should be appreciated that many equivalents, alternatives, variations, and modifications, aside from those expressly stated, are possible.

The invention claimed is:

1. A system for controlling lubrication, the system comprising:
   a temperature control module that controls temperature for a lubricant in a vehicle;
   a pressure control module that controls pressure for the lubricant in the vehicle; and
   a lubrication controller operatively coupled to the temperature control module and the pressure control module, wherein the lubrication controller:
   receives a temperature from at least one temperature sensor and a pressure from at least one pressure sensor;
   determines a viscosity of the lubricant in the vehicle using the temperature, the pressure, and a pressure-temperature-viscosity correlation;
   performs a comparison to determine whether the viscosity is within a predetermined viscosity range or whether the viscosity differs from a predetermined value;
   based on the comparison, sends a temperature control signal to the temperature control module, and responsive to the temperature control signal, the temperature control module modifies or maintains the temperature of the lubricant to control lubrication; and
   sends a pressure control signal to the pressure control module, and responsive to the pressure control signal, the pressure control module modifies or maintains the pressure of the lubricant to control lubrication.

2. The system of claim 1, wherein the lubrication controller obtains the pressure-temperature-viscosity correlation from a memory associated with the vehicle, and the pressure-temperature-viscosity correlation relates pressure, temperature, and viscosity values for the lubricant in the vehicle.

3. The system of claim 1, wherein the lubrication controller tracks the viscosity over a period of time to determine a condition of the lubricant, the vehicle, or both.

4. The system of claim 3, wherein the lubrication controller generates a report indicative of the condition of the lubricant, the vehicle, or both.

5. A method for controlling lubrication, the method comprising:
   receiving a temperature of a lubricant in a vehicle measured using at least one temperature sensor disposed on the vehicle;
   receiving a pressure of the lubricant in the vehicle measured using at least one pressure sensor disposed on the vehicle;
   determining a viscosity of the lubricant using the temperature, the pressure, and a pressure-temperature-viscosity correlation;
   performing a comparison to determine whether the viscosity is within a predetermined viscosity range or whether the viscosity differs from a predetermined viscosity value;

sending a temperature control signal to a temperature control module based on the comparison, and responsive to the temperature control signal, controlling lubrication by modifying or maintaining the temperature of the lubricant using the temperature control module; and sending a pressure control signal to a pressure control module based on the comparison, and responsive to the pressure control signal, controlling lubrication by modifying or maintaining the pressure of the lubricant using the pressure control module.

6. The method of claim 5 further comprising measuring the temperature and the pressure concomitantly.

7. The method of claim 5 further comprising obtaining the pressure-temperature-viscosity correlation from a memory associated with the vehicle, wherein the pressure-temperature-viscosity correlation relates pressure, temperature, and viscosity values for the lubricant in the vehicle.

8. The method of claim 5 further comprising tracking the viscosity over a period of time to determine a condition of the lubricant, the vehicle, or both.

9. The method of claim 8 further comprising generating a report indicative of the condition of the lubricant, the vehicle, or both.

* * * * *